(12) United States Patent
Fuchigami

(10) Patent No.: US 7,014,778 B2
(45) Date of Patent: Mar. 21, 2006

(54) DEVICE AND METHOD FOR TREATING WASTE PRODUCT

(76) Inventor: Yoshiharu Fuchigami, Mugino 6-3-17-206 Hakataku, Fukuoka (JP)

( * ) Notice: Subject to any disclaimer, the term of this patent is extended or adjusted under 35 U.S.C. 154(b) by 376 days.

(21) Appl. No.: 10/654,427

(22) Filed: Sep. 4, 2003

(65) Prior Publication Data

US 2005/0011817 A1 Jan. 20, 2005

(30) Foreign Application Priority Data

Jul. 15, 2003 (KR) .................... 10-2003-0048332

(51) Int. Cl.
*C02F 11/00* (2006.01)

(52) U.S. Cl. .............................. 210/739; 4/317; 4/318; 4/319; 4/321; 4/209 R; 210/85; 210/86; 210/167; 210/175; 210/180; 210/194; 210/257.1; 210/258; 210/770; 210/772; 210/774; 210/805; 210/173; 110/165 R; 110/233; 110/238; 110/346

(58) Field of Classification Search ................ 210/85, 210/86, 97, 143, 167, 173, 175, 180–182, 210/194, 195.1, 257.1, 258, 259, 739, 744, 210/770–774, 805, 806; 4/209 R, 317–323; 110/165 R, 233, 238, 345, 346
See application file for complete search history.

(56) References Cited

U.S. PATENT DOCUMENTS

| 3,733,617 | A | * | 5/1973 | Bennett | .......................... | 4/315 |
| 4,359,789 | A | * | 11/1982 | Roberts | .......................... | 4/300 |
| 5,265,544 | A | * | 11/1993 | Bigelow et al. | ............ | 110/345 |

* cited by examiner

*Primary Examiner*—Joseph Drodge
(74) *Attorney, Agent, or Firm*—Birch, Stewart, Kolasch & Birch, LLP

(57) ABSTRACT

A method and device are provided for treating a waste water waste-product mixture from a toilet by coupling the toilet to a waste product mixture to a waste product holding tank, connecting the tank with a vacuum container having a stirring member for breaking up the waste product and a heating system for drying the waste product to an ash, introducing water from a water holding tank that communicates with the toilet to the ash to form a gel, separating the water from the gel, returning the water to the water holding tank, and discharging the gel residue.

5 Claims, 3 Drawing Sheets

DEVICE AND METHOD FOR TREATING WASTE PRODUCT

BACKGROUND OF THE INVENTION

This non-provisional application claims priority under 35 U.S.C. § 119(a) on Patent Application No. 2003-0048332 filed in Korea on Jul. 15, 2003, which is herein incorporated by reference.

FIELD OF THE INVENTION

The present invention relates to a device and method for treating waste product and more particularly, to an improved device and method for incinerating solid waste product such as night soil in a movable or non-movable toilet room while eliminating environmental pollution.

RELATED ART

Various types of devices and methods for treating waste product include a toilet connected to a sewer pipe so that the waste product can be treated sanitarily. However, since in rural areas, e.g., camping areas, construction areas, parking lots, certain resort areas, etc., there is no sewer pipe, it is difficult to treat the waste product utilizing a sewer system.

Accordingly, in order to treat waste products in such areas, it is known to use conventional enzyme-bacteria decomposing toilet systems. However, a conventional enzyme decomposing toilet systems suffer from a number of problems. For example, such systems require a lot of water with associated high cost and cannot be used during the winter season. Also, conventional incineration devices for treating waste product has a complicated structure.

SUMMARY OF THE INVENTION

Therefore, it is an object of the present invention to provide an improved device and method for treating waste product which eliminates the above problems and limitations associated with the conventional art.

Another object of the present invention is to provide an improved device and method for incinerating solid waste product after the dehydration of night soil in a toilet room and using it effectively while preventing environmental pollution.

Still another object of the present invention is to provide a device for treating waste product which is simple in structure, inexpensive to manufacture, durable in use, and refined in appearance.

In accordance with an embodiment of the present invention, a device for treating waste product has been developed which includes a waste product holding tank containing a water pump which communicates with a vacuum pot for receiving the waste product from the holding tank according to the operation of a sensor; a vacuum pump and an electromagnetic wave member for dehydrating the waste product, a ball miller for crushing the solid waste product, which is then incinerated by a heater; mixing the incinerated product with water and separating the water from the crushed solid waste product using a strainer. The device according to the present invention can be conveniently used in the country area while preventing environmental pollution.

In accordance with an embodiment of the present invention, a method for treating a waste product comprises the steps of: transferring waste product to a holding tank and to a vacuum pot according to the operation of a preset sensor; dehydrating the waste product in the vacuum pot to produce a solid waste product by operating a vacuum pump and an electromagnetic wave member; crushing the solid waste product by a ball mill; watering the crushed product; and separating water from the mixed product by passing it through a strainer where the solid waste product is removed therefrom and placed in a holding tank.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
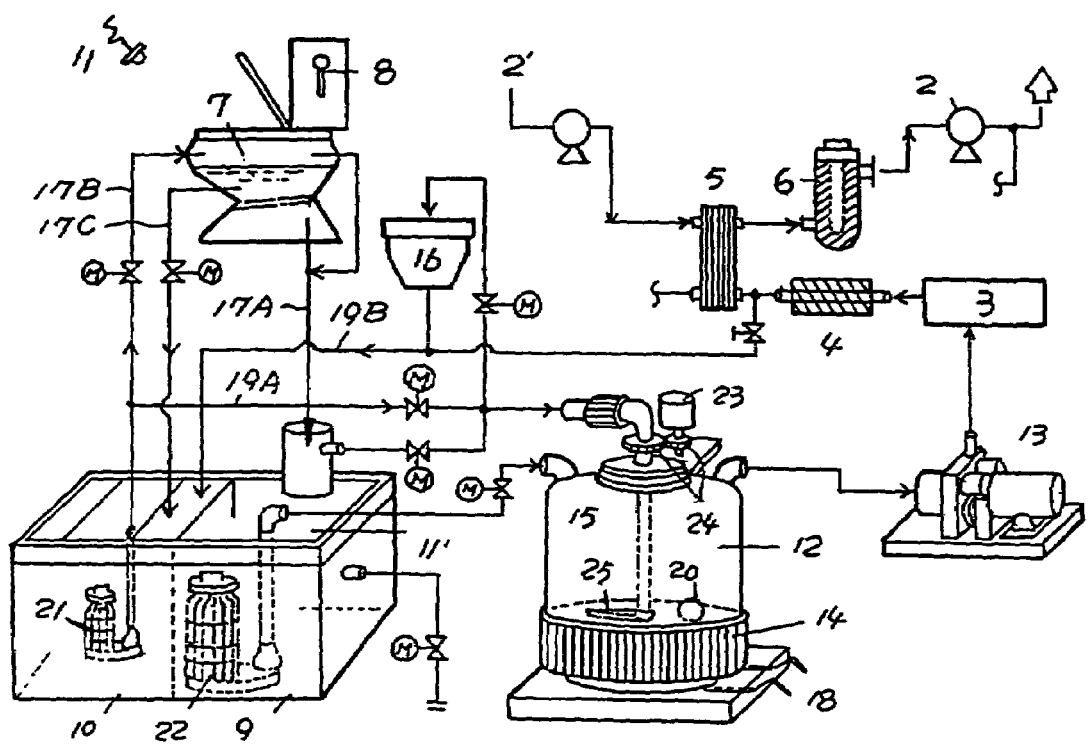
FIG. 1 is a partially diagrammatic perspective view of a device for treating waste product according to the present invention.

Referring now in detail to the drawings for the purpose of illustrating the preferred embodiments of the present invention, the device for treating waste product as shown in FIGS. 1, 2, 3 and 4, comprises a toilet 7 in a toilet room 1, a waste product holding tank 9, and a water holding tank 10, both disposed under the toilet 7, and a vacuum pot 12 disposed near the waste product holding tank 9 and the water holding tank 10.

In the toilet room, there is a first sensor 11 for sensing when a user uses the toilet 7 and operating an optical catalyst deodorizer 6, a plate type heat exchange freezer 5, an air cooling type freezer 4, a high temperature heater deodorizer 3, a cooling fan 2' and a ventilating fan 2 for refrigerating moisture to water to be drained to the water holding tank 10, through a fifth pipe 19B and ventilating odor to outside of the toilet room 1.

After the user uses the toilet 7 and flushes it with a flushing lever 8, water mixed with waste product in the toilet 7 moves to the waste product holding tank 9 though a first pipe 17A. Thereafter, when the flushing lever 8 returns to its original position, water in the water holding tank 10 is pumped to the toilet 7 by a first water pump 21 through a second pipe 17B. Also, surplus water in the toilet 7 can be drained to the water holding tank 10.

Figure 2:
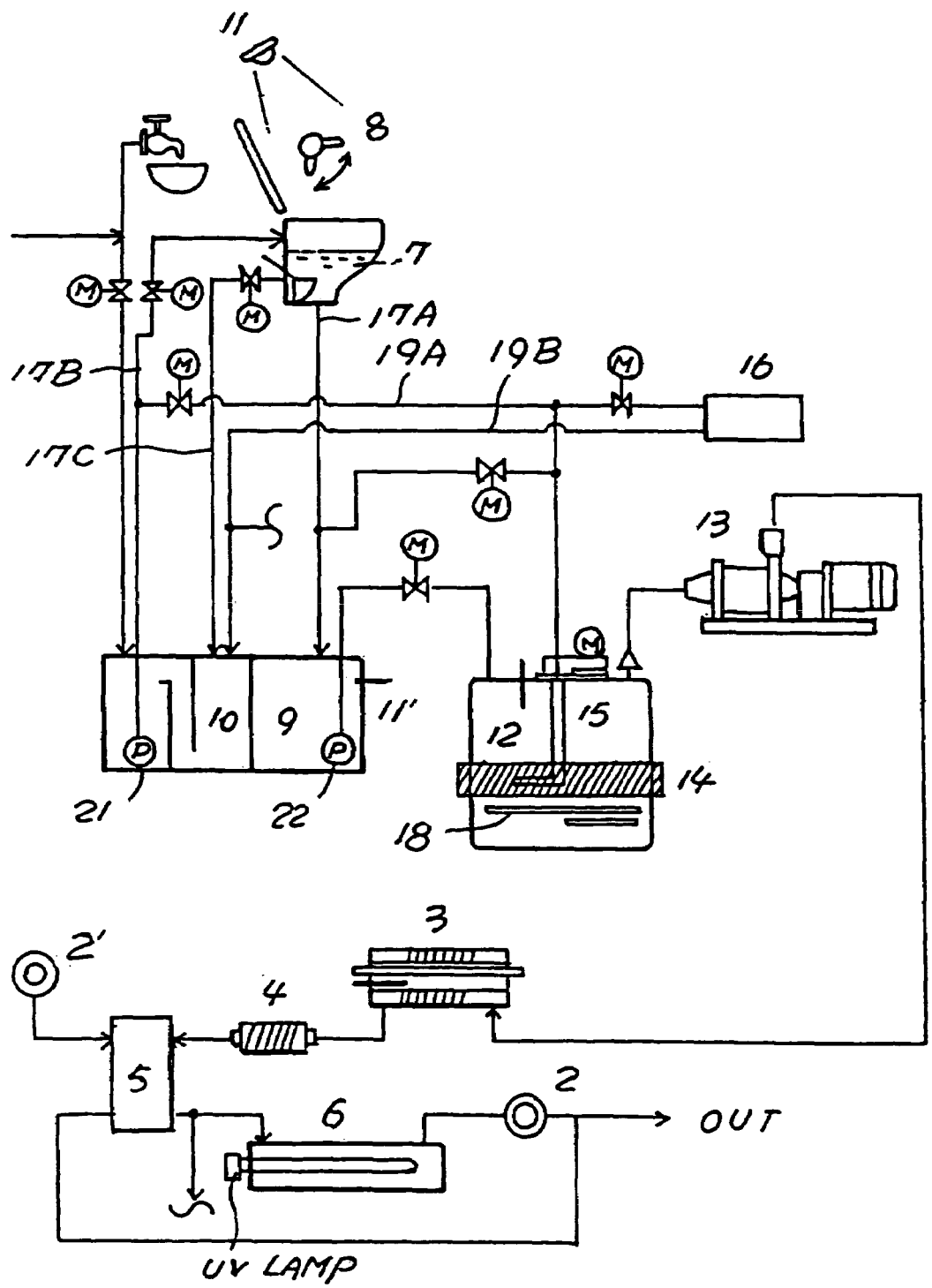
FIG. 2 is a diagrammatic side view of a device for treating waste product according to the present invention.
Figure 3:
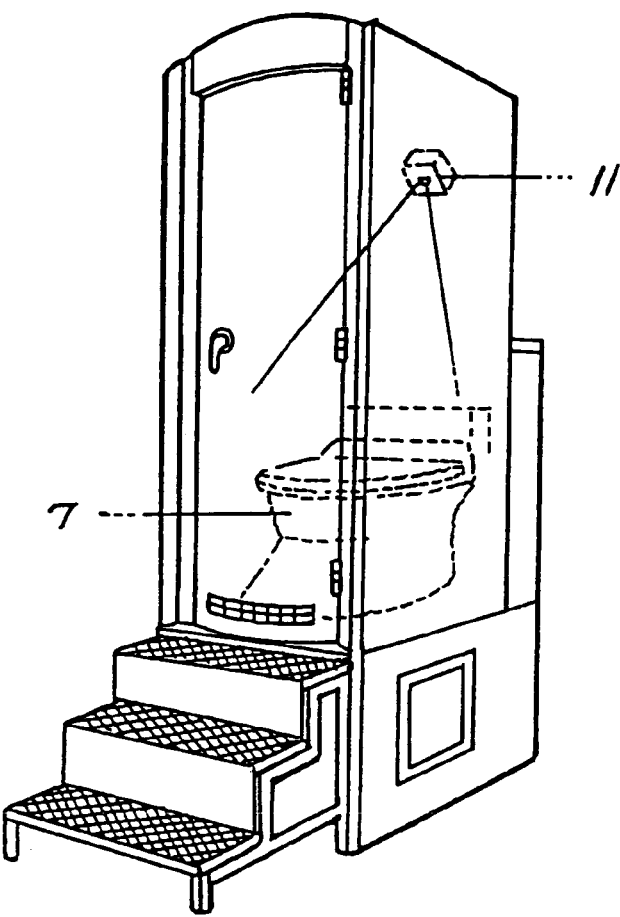
FIG. 3 is a perspective view of a device for treating waste product according to the present invention, which is installed in a portable toilet room.
Figure 4:
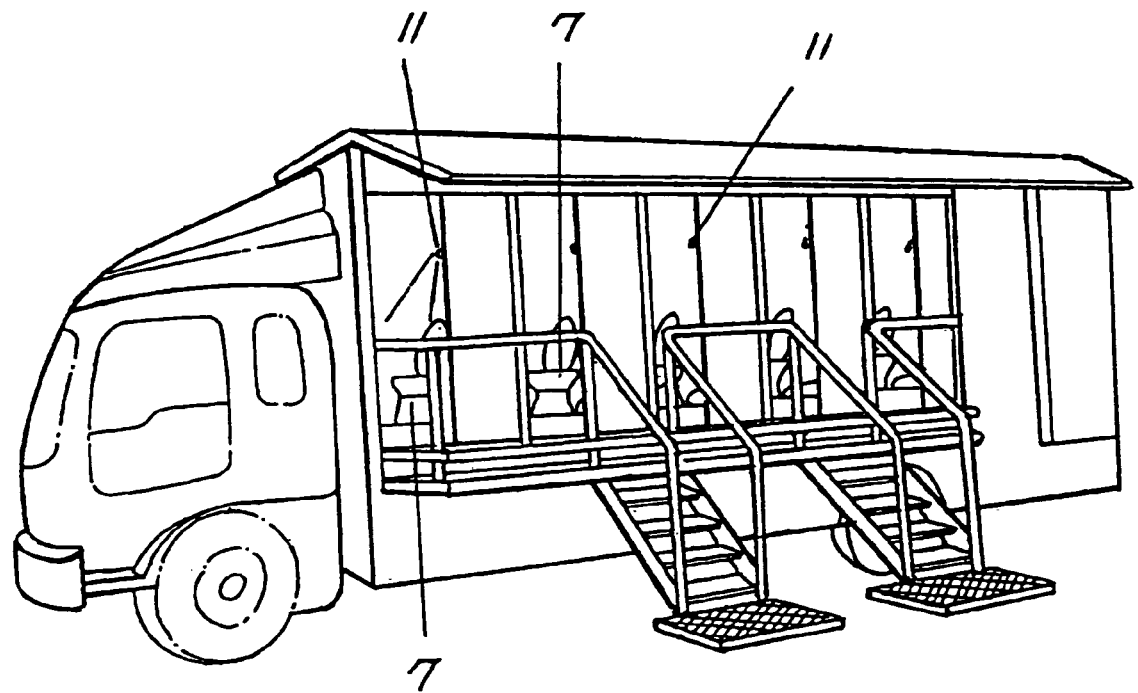
FIG. 4 is a perspective view of a device for treating waste product according to the present invention, which is installed in portable, multiple toilet.

Referring in detail to FIGS. 1 and 2, a second water pump 22 disposed in holding tank 9 communicates with a vacuum pot 12, which draws the water-waste product mixture from the holding tank 9 when a certain volume thereof exceeds a level sensed by a second sensor 11'. As soon as the vacuum pot 12 receives the water-waste product mixture from the waste product holding tank 9, the water-waste product mixture is dried by a vacuum pump 13 and an electromagnetic wave member 14 to produce a dried waste product. Thereafter, the dried waste product in the vacuum pot 12 is crushed by a stirring member 15 which includes a motor 23, a gear 24 and a scoop 20, to produce a powder. Then the powder in the vacuum pot 12 is burned to ashes by a heater 18. At this time, water from the water tank 10 is added to the ashes in the vacuum pot 12 through a fourth pipe 19A for making an ash gel. The ash gel is transferred to a strainer 16 for separating the residue from the liquid (water) and recycling water to the water holding tank 10.

Referring in detail to FIGS. 1, 2, 3, and 4, the device for treating waste product of the present invention operates as follows: When the user enters into the house type toilet room 1 or the automobile type toilet room 1', as soon as the first sensor 11 detects the presence of the user, the ventilating fan 2, cooling fan 2', high temperature heater deodorizer 3, air cooling type refreeze 4, plate type heat exchange freezer 5, and optical catalyst deodorizer 6 are simultaneously activated for ventilating odor to the outside thereof, and for sending refrigerated water to the water holding tank 10 through the fifth pipe 19B.

After using the toilet 7, when the user flushes the flushing lever 8, the water, approximately 300 cc stored in the toilet 7 and waste product is transferred to the waste product holding tank 9 through the first pipe 17A. After the flushing lever 8 returns to its original state, the water in the water holding tank 10 is introduced to the toilet 7 by the first water pump 21 through the second pipe 17B. The introduced water is cleaned and approximately 300 cc may remain in the toilet. Surplus water can be drained into the water holding tank 10 through the third pipe 17C.

When the water-waste product mixture in the waste product holding tank 9 reaches a predetermined level, the second sensor 11' senses to operate the second water pump 22 for inducing approximately 10 liters of the water-waste product mixture into the vacuum container 12. As soon as the water-waste product mixture has been transferred to the vacuum pot 12, it undergoes a heating operation through vacuum pump 13 and the electromagnetic wave member 14, whereby the waste product dries up and the moisture in the waste product evaporates and is then refrigerated to become water which is sent to the water holding tank 10 through the vacuum pump 13, high temperature heater deodorizer 3, air cooling type freezer 4, cooling fan 2' and the plate-type heat exchange freezer 5.

The dried waste product remaining in the vacuum pot 12 in the form of a lump of solid material, is ground into a powder by the ball mill operation of the stirring member 15 and ball 20. The powder is then burned into ash by the heater 18. Thereafter, water from the water holding tank 10 is added to the ash to make a kind of gel which is transferred to the strainer 16, where the residue is separated from the liquid (water) and the water is drained into the water holding tank 10 through the fifth pipe 19B. If necessary, a filter can also be installed in the water holding tank 10.

The device for treating waste product according to the present invention has the following advantages. Since the method for treating waste product is repeatable, environmental pollution can be prevented. Also, while the device according to the present invention is operating, the user can still use the toilet 7. Also, the device of the present invention can be utilized in rural areas, such as construction areas, factory areas, resort areas, parking lots, etc.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for treating waste product, which comprises:
    a toilet having a first sensor disposed in the vicinity of the toilet for sensing a user and producing a waete-water wasteproduct mixture;
    a waste product holding tank communicating with the toilet, the waste product holding tank containing a water pump disposed therein; and
    a second sensor provided for sensing the volume of the waste-water product mixture;
    a water holding tank communicating with the toilet, the water holding tank having a water pump disposed therewithin for pumping water to the toilet during the flushing operation;
    a vacuum container connected with the waste product holding tank and the water holding tank, the vacuum container operating to transfer the waste product produced-water mixture from the waste product holding tank to the vacuum container;
    a stirring member disposed in the vacuum container for breaking up waste product transferred thereto;
    a heating system operatively associated with the vacuum container for drying the waste product to an ash;
    means for introducing water from the water holding tank to ash in the vacuum container to form a gel; and
    means for separating the water from the gel, returning the water to the water holding tank, and discarding the gel residue.

2. The device of claim 1, further comprising a ventilating fan, a high temperature heater deodorizer, a cooling device, a plate type heat exchange device, and an optical catalyst deodorizer for ventilating odor and refrigerating moisture to make water to be sent to the water holding tank while the user are using the toilet.

3. The device of claim 1, wherein the toilet is provided with a flushing lever disposed on the outside thereof for flushing after the user finishes using the toilet, so that the water-waste product mixture from the toilet is transferred to the waste product holding tank when the user flushes the toilet.

4. The device of claim 1, wherein the heating means includes an electromagnetic wave member.

5. A method for treating a waste product, which comprises the steps of:
    (a) Sensing the presence of a user of a toilet room;
    (b) ventilating odor from the toilet facility, utilizing a ventilating fan, a high temperature heater deodorizer, an air cooling type freezer, a plate type heat exchanger, and an optical catalyst deodorizer;
    (c) refrigerating moisture in the toilet room through the cooling fan, the air cooling type freezer, and the plate type heat exchange freezer, and an optical catalyst deodorizer while the user is using the toilet;
    (d) draining water-waste product mixture in the toilet to a waste product holding tank when the user flushes the toilet;
    (e) pumping water from a water holding tank to the inside of the toilet, to clean the toilet when the flushing lever returns to its original state;

(f) pumping the water-waste product mixture in the waste product holding tank to a vacuum container;
(g) breaking up the waste product;
(h) drying the water-waste product mixture in the vacuum container by applying heat to the mixture to produce a solid ash product;
(i) adding water to the solid ash product to form a gel;
(j) passing the gel through a strainer to separate the water from the gel and form a residue;
(k) returning the water to the water holding tank; and
(l) discarding the residue.

* * * * *